UNITED STATES PATENT OFFICE.

THEODORE CORNWELL, OF CORTLAND, NEW YORK.

MEDICINAL COMPOUND.

SPECIFICATION forming part of Letters Patent No. 262,744, dated August 15, 1882.

Application filed May 2, 1882. (No specimens.)

*To all whom it may concern:*

Be it known that I, THEODORE CORNWELL, of Cortland village, in the county of Cortland and State of New York, have invented certain new and useful Improvements in Tonic and Medicinal Compounds; and I do hereby declare that the following is a full, clear, and exact description of the invention, which will enable others skilled in the art to which it appertains to make and use the same.

My invention relates to an improvement in tonic and medicinal compounds, as set forth in the following formula.

The ingredients of which this medicinal compound is formed is cider brandy, soft water, phosphoric acid, or solution of acid phosphate, sugar-sirup, and essence or extract of orange-peel.

This compound I intend as a recuperative after fevers, or in debilitated and low conditions of the system. It may be also given with advantage in rheumatism and like ailments. The proportions I find most favorable are as follows: I take of cider-brandy, twenty gallons; soft water, ten gallons; dilute phosphoric acid, one-half gallon, or equivalent amount of solution of acid phosphate; sugar-sirup, five gallons; extract of orange-peel, two gallons.

The extract of orange-peel is procured by immersing the peel of orange in alcohol, using sufficient alcohol only to cover. In lieu of this I may use one ounce of oil of orange, which is stirred into the brandy, followed by the balance of the ingredients. In some cases I may substitute five gallons of lime-juice for the acid or acid phosphate, or use a portion instead thereof; but I prefer the formula first given. Should any cloudiness appear, the mixture may be filtered, as it may in some cases be necessary, when the oil is used in lieu of the peel. To give it a bright straw color a small proportion of curcuma, which is harmless, may be added.

As thus combined the tonic and neutralizing effects of the acid used makes an agreeable sustaining remedy, which I have found efficient in the diseases and conditions above named.

This remedy may be taken in doses of a table-spoonful to a wine-glassful, either before or after eating, but should not be given with or followed immediately by milk or compounds containing milk.

In bottling this remedy it may be aerated, if desired.

I am aware that acid phosphates and phosphoric acid have heretofore been employed in preparations to be used as beverages or for medicinal purposes, and hence I do not claim the use of such, broadly.

What I claim, and desire to secure by Letters Patent, is—

The herein-described medicinal and tonic beverage, consisting of cider-brandy, soft water, phosphoric acid, or solution of acid phosphates, sugar-sirup, and essence or extract of orange-peel, in the proportions substantially as specified.

In testimony that I claim the foregoing as my own I have hereto affixed my signature in presence of two witnesses.

THEODORE CORNWELL.

Witnesses:
B. A. BENEDICT,
H. L. BRONSON.